Jan. 30, 1968    E. C. RHYNE, JR    3,366,868

FREQUENCY REDUCING DEVICE

Filed March 31, 1964

United States Patent Office 3,366,868
Patented Jan. 30, 1968

3,366,868
FREQUENCY REDUCING DEVICE
Earl C. Rhyne, Jr., Millis, Mass., assignor to Dielectric Products Engineering Co., Inc., Littleton, Mass., a corporation of Michigan
Filed Mar. 31, 1964, Ser. No. 356,191
6 Claims. (Cl. 321—61)

My invention relates to frequency changing devices and in particular to a frequency reducing circuit for generating subharmonics of an input frequency.

In such devices an input source of one frequency charges a capacitor through a closed starting switch connected across a reactor that is tuned with the capacitor to the desired, preferably odd, subharmonic frequency. At the moment of peak charge across the capacitor, the switch is opened, and the capacitor discharges through the saturable reactor thereby adding an asymmetrical voltage component to the alternating voltage applied by the input source. The core of the reactor is such as to respond to the combined voltage by saturating just prior to the elapse of three or a higher odd number of half-cycles of the input voltage, that is when the capacitor voltage has reversed from one peak to the opposite peak three or a higher number of times. During discharge of the capacitor the reactor exhibits a high impedance. However, after saturation it exhibits a low impedance, which permits the then reversed input voltage to rapidly charge the capacitor, at that time in the opposite direction. As the capacitor begins to discharge, the reactor desaturates and again exhibits a high impedance. Thus the capacitor will rapidly charge and discharge at the subharmonic frequency. Both the reactor and capacitor can be made high Q components so that an output voltage taken across the capacitor will be a substantially sinusoidal subharmonic of the input frequency.

The operation of this device depends to a large extent upon the accuracy with which the starting switch is opened at the proper phase of the input voltage, and it is an object of this invention to provide switch means which open at the precise optimum moment.

Figure 1:
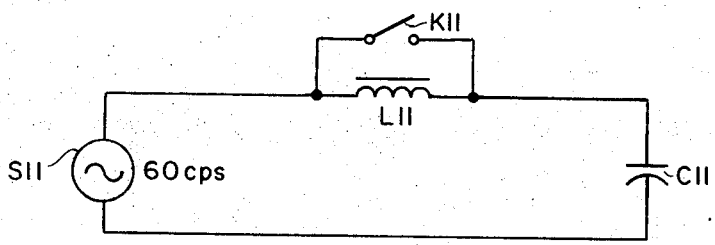
Figure 2:
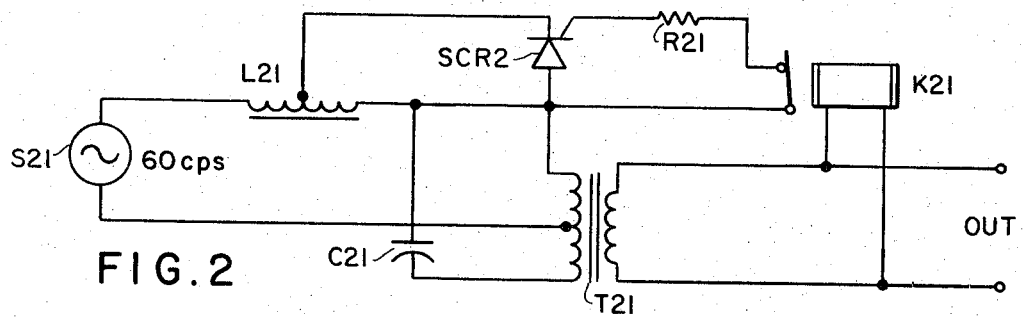
Figure 3:
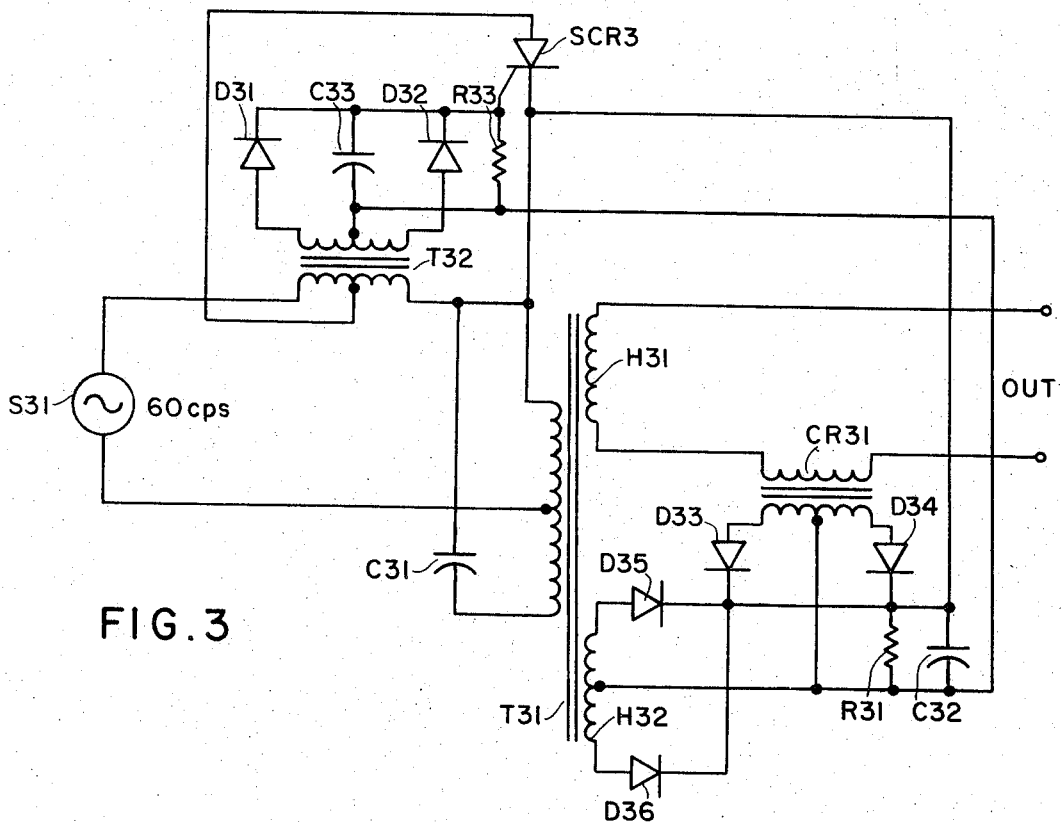

The invention and its other objects and advantages will be evident from the following descripton of the prior art and circuits embodying features of the invention. However, it will be obvious to those skilled in the art that the invention may be embodied otherwise than shown in the accompanying drawings, wherein:

FIG. 1 is a circuit illustrating the principles and problems of the present invention;
FIG. 2 is a circuit illustrating an embodiment of the present invention; and
FIG. 3 is another circuit showing an embodiment of the present invention.

FIG. 1 illustrates the fundamental principles of a frequency changer. A 60 cycle source S11 energizes a saturable inductor L11 which is connected in series with a capacitor C11 and is tuned, therewith, to a frequency which is a subharmonic of the 60 cycle input, namely 20 cycles per second. Thus the series circuit of L11 and C11 presents a substantial impedance to the 60 cycle per second input from the source S11. A switch K11 is connected across the inductor L11. In operation, the switch K11 is first closed, the capacitor C11 then charges and discharges due to the 60 cycle per second input. The switch K11 is opened at the instant of maximum charge upon the capacitor C11, which instant happens to be the moment when no further current flows through the switch K11 because the voltage across C11 is equal to the voltage across the 60 cycle per second input S11. The capacitor C11 then begins to discharge through the inductor L11 at a rate determined by the tuning of the circuit C11, L11. The discharge from the capacitor adds an asymmetrical component to the reactor current and voltage produced by the generator S11. The inductor L11 is proportioned to saturate as a result of these combined effects just prior to the elapse of three half-cycles of the source S11, due to the non-symmetrical current and the non-symmetrical voltage across the inductor L11. At that saturation point, the impedance of the inductor decreases markedly and represents a short circuit which permits a current surge to the capacitor C11, charging it to its maximum value. Because essentially three half-cycles, i.e. three voltage reversals, of the 60 cycle input voltage have elapsed since the starting switch K11 opened, the source voltage will suddenly charge the capacitor in the other direction to the opposite peak value of the input voltage. As the input voltage passes its opposite peak, its value is less than the then charged capacitor so that the capacitor starts discharging in the other direction. This causes desaturation of the inductor L11 in a very short time, less than one-half cycle of the 60 cycle input. The discharge of the capacitor C11 again is superimposed upon the current through the then unsaturated inductor for three half-cycles until the unsymmetrical current and voltage of the inductor L11 again saturates the inductor L11 in the opposite direction. A full cycle of capacitor charge and discharge has then been completed. A 20 cycle voltage can be derived from across the capacitor C11, the voltage having a substantially sinusoidal waveform if L11 and C11 are high Q components.

It will be noted that for operation of the circuit in FIG. 1 to be initiated successfully, it is essential that the switch K11 be opened at precisely the peak of the voltage from the 60 cycle per second source. The circuitry for opening the switch at such time can become rather complicated when great accuracy is desired. Furthermore, the circuitry becomes even more complicated if the voltage from source S11 has been interrupted and it is necessary to close the switch K11 and reopen it to again resume operation.

It is an object of the present invention to provide a frequency changing device operating on the principle of that in FIG. 1, which has a simple means for initiating sub-cycle operation at precisely the right time in the half-cycle.

More particularly, it is an object of the present invention to provide a frequency changing system which will resume operation in the event of a breakdown and open the switch across the operating inductor at precisely the right time.

A circuit of this type is shown in FIG. 2. In FIG. 2 a 60 cycle source S21 again charges a capacitor C21 through a saturable inductor L21 and the auto-transformer constituted by the primary winding on a transformer T21. The latter operates as an output transformer having a secondary winding whose ends connect to output terminals OUT and across a relay coil K21. The latter possesses a normally closed contact which, with a resistor R21, forms part of the trigger circuit of a silicon controlled rectifier SCR2. The main path of current flow in the silicon controlled rectifier SCR2 connects from one side of the inductor L21 to a center tap thereon. When conductive, the SCR2 operates as a short circuit across half of the windings of the inductor L21 and by autotransformer action constitutes a short circuit across the entire inductor L21. In FIG. 2, as in FIG. 1, the inductor L21 and its capacitor C21 are proportioned to resonate at 20 cycles per second.

In operation, the source S21 applies a 60 cycle voltage across the inductor L21 and the capacitor C21 which is essentially in series therewith and behaves as a comparatively high impedance to the 60 cycle input. The voltage from the source S21 is also applied across the main path of current flow of the silicon controlled rectifier SCR2 whose gate is energized because the contact of the relay K21 is closed. Thus, the SCR2 is conductive and effectively short circuits the inductance L21. However, when the input voltage and the voltage across the capacitor C21 reach a peak, and are equal, the voltage across the inductor L21 and SCR2 is zero and begins to reverse. That is, the current through the SCR2 becomes zero because the voltage across the top portion of the transformer T21 is then equal to the voltage peak at the source S21. Thus, current through SCR2 is zero and tends to start in the other direction. However, such current reversal cannot occur in the SCR2 and the latter becomes nonconductive. As the capacitor C21 begins to discharge, as described in FIG. 1, through the inductor L21, it creates an unsymmetrical voltage and current in the circuit. The inductor L21 is proportioned to energize or to saturate just prior to an elapsed time equal to three half-cycles of a 60 cycle rate. Saturation then reduces the impedance of the inductor L21 to a negligible value and the capacitor C21 is charged in the opposite direction because the source S21 is at a peak three half-cycles away from the time when the SCR2 was extinguished. As the source S21 passes this peak, the current through the inductor L21 reverses and the capacitor C21 again begins to discharge at a 20 cycle rate. Three half cycles later, the inductor L21 again saturates, permitting the capacitor C21 again to be charged fully. The capacitor C21 and inductor L21 are high Q components, so that the output voltage appearing across the terminals OUT and across the relay winding of K21 is substantially sinusoidal. This voltage also energizes the relay winding of K21 and opens its contact thereby preventing the silicon controlled rectifier SCR2 from igniting and interfering with the operation. In the event of failure of the line voltage, the output voltage will be reduced to zero and the relay K21 will become deenergized, thereby applying a starting voltage across the SCR2. Upon resumption of voltage, the SCR2 will conduct and short circuit the inductor L21 until a peak voltage is reached in the right direction. At that point, the SCR2 will be extinguished at just the right moment of current reversal to initiate operation of the frequency changer.

The operation of the frequency changer is made possible essentially by the fact that the instant that the voltage across the capacitor is maximum coincides exactly with the instant that the voltage across the inductor L21 and the SCR2 reverses. The timing circuit which had hitherto been necessary for opening the switch across the inductor is completely unnecessary.

It is possible to operate and control the gate of the SCR2 by solid state devices rather than the relay K21. Such a system is shown in FIG. 3. Here the components S31, C31 and the primary winding of T32 correspond to the component S21, C21 and L21. The rectifier SCR3 corresponds to SCR2 and the transformer T31 corresponds to the transformer T21. However, the transformer T32, unlike the inductor L21, includes a secondary winding which produces a direct voltage across a capacitor C33 and a resistor R33 through a full-wave rectifier system composed of diodes D31 and D32. Producing a direct voltage across a resistor R31 and capacitor C32 is a current transformer CR31 in the output line of the secondary of transformer T31 operating with a full-wave rectifier having diodes D33 and D34. A similar voltage is produced across R31 and C32 by a secondary winding H32 of the transformer T31 operating with two full-wave connected diodes D35 and D36.

Thus there are three new voltage sources. One voltage is derived from the secondary winding of the transformer T32 and provides a continuous on-biasing voltage across the gate of the SCR, that is, from the gate to the cathode voltage. The SCR3 is turned in a direction opposite to that shown in FIG. 2. A second voltage, which is derived from the current transformer CR31 in series with the secondary winding of the transformer T1, tends to switch off the SCR3 when current flows, as during a short-circuit load. The third voltage is derived from the winding H32 of the transformer T31 and also tends to switch off the SCR, only when the voltage exists across the output terminals. The voltages provided by the transformer T1 must be large enough to override the on-bias provided by the transformer TR32. Thus, normally the SCR1 is turned on and is extinguished by reversal of current flow therethrough. It is maintained off by the appearance of an output current or voltage of sufficient amplitude.

I claim:

1. A frequency reducing device comprising saturable reactor means for saturating after a predetermined volt-second input, capacitor means, network means for connecting said saturable reactor means and said capacitor means in series resonant relation, output means coupled to said capacitor means and providing a voltage dependent upon the voltage across said capacitor means, semiconductor controlled rectifier means having a path of main current flow connected to said reactor means to provide a low impedance path across said reactor means when conducting and having an ignition electrode, and circuit means coupled to said output means for biasing said ignition electrode to turn said semiconductor controlled rectifier means on and coupled to said output means for biasing said semiconductor controlled rectifier means off in accordance with an electrical signal at said output means.

2. A frequency reducing device comprising saturable reactor means for saturating after a predetermined volt-second input, capacitor means, network means for connecting said saturable reactor means and said capacitor means in series resonant relation, output means coupled to said capacitor means and providing a voltage dependent upon the voltage across said capacitor means, silicon controlled rectifier valve means having a path of main current flow connected across at least a portion of said reactor means to provide a low impedance path across said reactor means when conducting and having an ignition electrode, and circuit means including a normally closed relay contact coupled to said output means and connected to said ignition electrode and a relay coil for opening said contact in accordance with an output current.

3. A frequency reducing device comprising saturable reactor means for saturating after a predetermined volt-second input, capacitor means, network means for connecting said saturable reactor means and said capacitor means in series resonant relation, output means coupled to said capacitor means and providing a voltage dependent upon the voltage across said capacitor means, silicon controlled rectifier valve means having a path of main current flow connected to said reactor means to provide a low impedance path across said reactor means when conducting and having an ignition electrode, and circuit means including first rectifying means connected to said ignition electrode for biasing said valve means on in accordance with the voltage across said reactor means, and second rectifying means connected to said ignition electrode for biasing said valve means off in accordance with a voltage at said output means and having an output voltage greater than said first rectifier means, said second rectifying means being operable in dependence upon a current in said output means.

4. A frequency reducing device comprising saturable reactor means for saturating after a predetermined volt-second input, capacitor means, network means for connecting said saturable reactor means and said capacitor means in series resonant relation, output means coupled to said capacitor means and providing a voltage dependent upon the voltage across said capacitor means, silicon controlled rectifier valve means having a path of main current flow connected to said reactor means to provide a low impedance path across said reactor means when conducting and having an ignition electrode, and circuit means including first rectifying means and connected to said ignition electrode for biasing said valve means on in accordance with the voltage across said reactor means, and second rectifying means connected to said ignition electrode for biasing said valve means off in accordance with a voltage at said output means and having an output voltage greater than said first rectifier means, said second rectifying means being operable in dependence upon a current in said output means, and third rectifier means connected to said ignition electrode for biasing said valve means off in accordance with the voltage at said output means and having a voltage output greater than said first rectifier means.

5. A frequency reducing device comprising saturable reactor means for saturating after a predetermined volt-second input, capacitor means, network means for connecting said saturable reactor means and said capacitor means in series resonant relation, output means coupled to said capacitor means and providing a voltage dependent upon the voltage across said capacitor means, valve means of thyratron-type operation having a path of main current flow connected to said reactor means to provide a low impedance path across said reactor means when conducting and having an ignition electrode, and circuit means for biasing said ignition electrode to turn said valve means on and coupled to said output means for biasing said valve means off in accordance with an electrical signal at said output means, said network means including an auto-transformer having an input connected to said reactor means and an output connected across said capacitor means.

6. A frequency reducing device comprising saturable reactor means for saturating after a predetermined volt-second input, capacitor means, network means for connecting said saturable reactor means and said capacitor means in series resonant relation, output means coupled to said capacitor means and providing a voltage dependent upon the voltage across said capacitor means, valve means of thyratron-type operation having a path of main current flow connected to said reactor means to provide a low impedance path across said reactor means when conducting and having an ignition electrode, and circuit means for biasing said ignition electrode to turn said valve means on and coupled to said output means for biasing said valve means off in accordance with an electrical signal at said output means, said path of main current flow being connected across a portion of the windings on said reactor means.

References Cited
UNITED STATES PATENTS

| | | | |
|---|---|---|---|
| 3,155,879 | 11/1964 | Casey et al. | 317—33 X |
| 3,292,074 | 12/1966 | Mortimer | 321—68 |
| 1,633,481 | 6/1927 | Fallou | 321—69 X |
| 2,088,618 | 8/1937 | Stocker | 321—69 |
| 2,340,376 | 2/1944 | Grandstaff | 321—68 X |
| 2,364,531 | 12/1944 | Huge | 321—68 X |
| 2,462,322 | 2/1949 | Huge | 321—69 |
| 2,787,755 | 4/1957 | Smith | 321—68 |
| 3,221,183 | 11/1965 | White | 307—88.5 |

JOHN F. COUCH, *Primary Examiner.*

G. GOLDBERG, *Assistant Examiner.*